(12) United States Patent
Ozaki et al.

(10) Patent No.: US 10,287,953 B2
(45) Date of Patent: May 14, 2019

(54) EXHAUST PURIFYING APPARATUS

(71) Applicant: KUBOTA Corporation, Osaka-shi, Osaka (JP)

(72) Inventors: Yuki Ozaki, Sakai (JP); Naoki Inoue, Sakai (JP); Tamotsu Ohashi, Sakai (JP); Kengo Hidaka, Sakai (JP); Hiroyuki Kawasoe, Sakai (JP); Masaru Hayashida, Sakai (JP); Shunji Okano, Sakai (JP); Michisuke Iga, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 0 days.

(21) Appl. No.: 15/579,761

(22) PCT Filed: Mar. 1, 2016

(86) PCT No.: PCT/JP2016/056175
§ 371 (c)(1),
(2) Date: Dec. 5, 2017

(87) PCT Pub. No.: WO2017/022261
PCT Pub. Date: Feb. 9, 2017

(65) Prior Publication Data
US 2018/0163599 A1 Jun. 14, 2018

(30) Foreign Application Priority Data
Aug. 5, 2015 (JP) .................................. 2015-154826

(51) Int. Cl.
*F01N 3/28* (2006.01)
*B01D 53/94* (2006.01)
(Continued)

(52) U.S. Cl.
CPC ........... *F01N 3/2807* (2013.01); *B01D 53/94* (2013.01); *B01D 53/9413* (2013.01);
(Continued)

(58) Field of Classification Search
CPC ........ F01N 3/2807; F01N 3/28; F01N 3/2839; F01N 3/10; B01D 53/94
(Continued)

(56) References Cited

U.S. PATENT DOCUMENTS 3,533,753 A * 10/1970 Berger .................... B01D 53/86
219/553
4,285,838 A * 8/1981 Ishida ................. B01D 53/8625
423/213.2
(Continued)

FOREIGN PATENT DOCUMENTS

| JP | S 4814306 B1 | 5/1973 |
|---|---|---|
| JP | H 02223622 A | 9/1990 |

(Continued)

OTHER PUBLICATIONS

Int'l Search Report dated Apr. 12, 2016 in International Application No. PCT/JP2016/056175.
(Continued)

*Primary Examiner* — Tom P Duong
(74) *Attorney, Agent, or Firm* — Panitch Schwarze Belisario & Nadel LLP

(57) ABSTRACT

An exhaust purifying apparatus is provided, that can be manufactured at low manufacturing costs and is capable of exhibiting high exhaust purifying performance. The exhaust purifying apparatus includes an exhaust passage, and an exhaust purifying member disposed in the exhaust passage. The exhaust purifying member is made of stainless steel. The surface of the stainless steel material is not covered with a catalyst coat containing a catalyst component, so that the
(Continued)

surface of the stainless steel material is brought into contact with exhaust. The exhaust purifying member is made of precipitation hardening stainless steel and/or austenitic stainless steel.

21 Claims, 9 Drawing Sheets

(51) Int. Cl.
| | |
|---|---|
| F01N 3/10 | (2006.01) |
| F01N 13/10 | (2010.01) |
| B01J 23/86 | (2006.01) |
| B01J 35/04 | (2006.01) |
| F01N 13/16 | (2010.01) |

(52) U.S. Cl.
CPC ............. *B01J 23/862* (2013.01); *B01J 35/04* (2013.01); *F01N 3/10* (2013.01); *F01N 3/28* (2013.01); *F01N 3/281* (2013.01); *F01N 3/2839* (2013.01); *F01N 13/10* (2013.01); *F01N 13/16* (2013.01); *F01N 2330/02* (2013.01); *F01N 2370/02* (2013.01)

(58) Field of Classification Search
USPC ........................................ 422/176, 177, 180
See application file for complete search history.

(56) References Cited

U.S. PATENT DOCUMENTS

| | | | | |
|---|---|---|---|---|
| 4,665,051 A | * | 5/1987 | Nonnenmann | B01J 35/04 422/180 |
| 4,976,103 A | * | 12/1990 | Takikawa | B01J 35/04 422/180 |
| 5,584,175 A | * | 12/1996 | Carlborg | B01J 35/0033 422/174 |
| 5,648,050 A | * | 7/1997 | Matsumoto | B01J 35/04 422/169 |
| 5,648,176 A | * | 7/1997 | Nakagawa | B01J 35/04 428/593 |
| 7,713,494 B2 | * | 5/2010 | Ichi | F01N 1/084 422/180 |

FOREIGN PATENT DOCUMENTS

| | | |
|---|---|---|
| JP | H05-141236 A | 6/1993 |
| JP | H07-039765 A | 2/1995 |
| JP | H09-103648 A | 4/1997 |
| JP | H11-226358 A | 8/1999 |
| JP | 2000073748 A | 3/2000 |
| JP | 2000329179 A | 11/2000 |
| JP | 2001140636 A | 5/2001 |
| JP | 201170484 A | 6/2001 |
| JP | 2002276349 A | 9/2002 |
| JP | 2006283586 A | 10/2006 |
| JP | 2010242744 A | 10/2010 |
| JP | 2012217937 A | 11/2012 |
| JP | 2013124579 A | 6/2013 |
| JP | 2013142360 A | 7/2013 |
| JP | 2015148189 A | 8/2015 |
| JP | 2015212541 A | 11/2015 |

OTHER PUBLICATIONS

Office Action dated Oct. 17, 2017 in JP Application No. 2014-021410.

* cited by examiner

FIG. 3
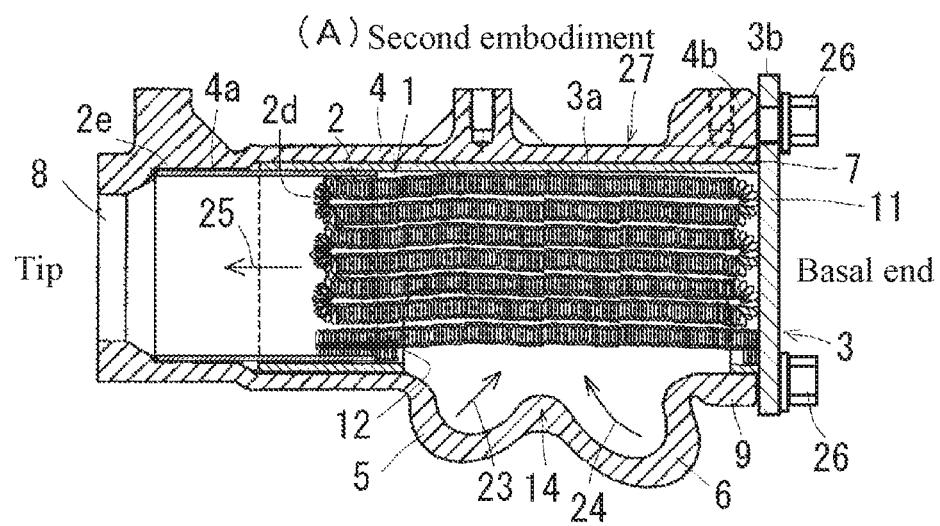
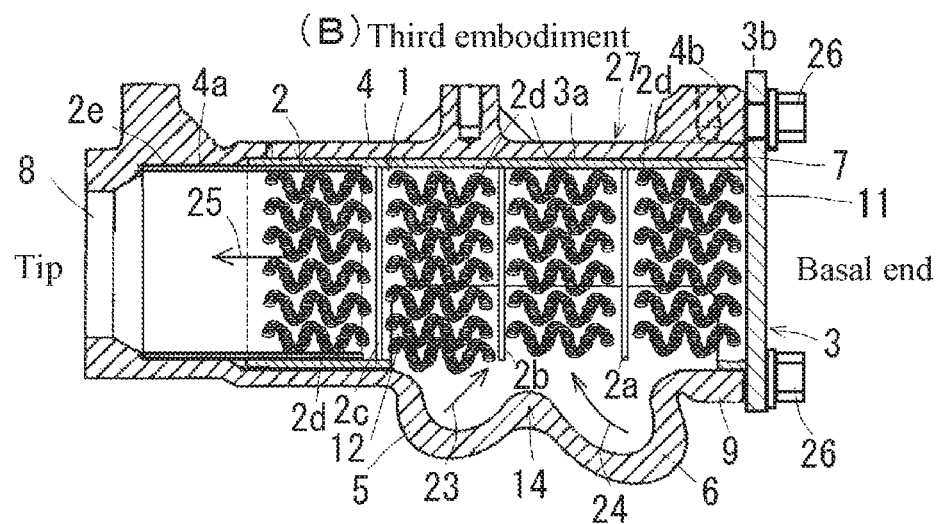

FIG. 5

Component and composition (unit %)

| | | C | Si | Mn | P | S | Ni | Cr | Mo | Cu | N |
|---|---|---|---|---|---|---|---|---|---|---|---|
| Precipitation hardening stainless steel | SUS630 | 0.07 or smaller | 1.00 or smaller | 1.00 or smaller | 0.040 or smaller | 0.030 or smaller | 3.0 ~5.0 | 15.0 ~17.5 | — | 3.0 ~5.0 | — |
| | SUS631 | 0.09 or smaller | 1.00 or smaller | 1.00 or smaller | 0.040 or smaller | 0.030 or smaller | 6.5 ~7.75 | 16.0 ~18.0 | — | — | — |
| Austenitic stainless steel | SUS316 | 0.08 or smaller | 1.00 or smaller | 2.00 or smaller | 0.045 or smaller | 0.030 or smaller | 10.0 ~14.0 | 16.0 ~18.0 | 2.0 ~3.0 | — | — |
| | SUS316L | 0.08 or smaller | 1.00 or smaller | 2.00 or smaller | 0.045 or smaller | 0.030 or smaller | 12.0 ~14.0 | 16.0 ~18.0 | 2.0 ~3.0 | — | — |
| | SUS304 | 0.08 or smaller | 1.00 or smaller | 2.00 or smaller | 0.045 or smaller | 0.030 or smaller | 8.0 ~10.5 | 18.0 ~20.0 | — | — | — |
| | SUS31803 | 0.03 or smaller | 1.00 or smaller | 2.00 or smaller | 0.040 or smaller | 0.030 or smaller | 4.50 ~6.50 | 21.0 ~24.0 | 2.5 ~3.5 | — | 0.08 ~0.20 |
| | SUS310S | 0.08 or smaller | 1.50 or smaller | 2.00 or smaller | 0.045 or smaller | 0.030 or smaller | 19.0 ~22.0 | 24.0 ~26.0 | — | — | — |
| Martensitic stainless steel | SUS440C | 0.95 ~1.02 | 1.00 or smaller | 1.00 or smaller | 0.040 or smaller | 0.030 or smaller | — | 16.0 ~18.0 | — | — | — |
| Ferritic stainless steel | SUS430 | 0.12 or smaller | 0.75 or smaller | 1.00 or smaller | 0.040 or smaller | 0.030 or smaller | — | 15.0 ~18.0 | — | — | — |

FIG. 6

| | Example 1 | Example 2-1 | Example 2-2 | Example 2-3 | Comparative Example 1 | Comparative Example 2 |
|---|---|---|---|---|---|---|
| Most upstream and most downstream plate members | Precipitation hardening stainless steel SUS630 | — | — | — | — | — |
| Intermediate plate member | Austenitic stainless steel SUS316 | — | — | — | — | — |
| Coil-shaped wire (shaped) | Austenitic stainless steel SUS316 | Precipitation hardening stainless steel SUS631 | Austenitic stainless steel SUS316 | Austenitic stainless steel SUS316L | — | Ferritic Fe-20Cr-5Al stainless steel with catalyst coat |
| Coil-shaped wire (swarf) | — | — | — | — | — | — |
| plate members identical in thickness | | | | | | |
| HC | 3.79 | 3.60 | 4.02 | 4.27 | 4.62 | 3.35 |
| NOx | 1.58 | 0.46 | 0.41 | 2.02 | 1.95 | 0.63 |
| HC+NOx | 5.37 | 4.06 | 4.42 | 6.30 | 6.58 | 3.98 |
| CO | 260 | 256 | 249 | 247 | 263 | 265 |

FIG. 7

| | Example 3-1 | Example 3-2 | Example 3-3 | Example 3-4 |
|---|---|---|---|---|
| Most upstream and most downstream plate members | — | — | — | — |
| Intermediate plate member | — | — | — | — |
| Coil-shaped wire (shaped) | — | — | — | — |
| Coil-shaped wire (swarf) | Precipitation hardening stainless steel SUS630 | Martensitic stainless steel SUS440C | Austenitic stainless steel SUS316L | Austenitic stainless steel SUS304 |
| Plate members identical in thickness | Austenitic stainless steel SUS316 | Austenitic stainless steel SUS316 | Austenitic stainless steel SUS316 | Austenitic stainless steel SUS316 |
| HC | 3.79 | 4.19 | 4.40 | 4.14 |
| NOx | 1.58 | 1.31 | 1.27 | 1.58 |
| HC+NOx | 5.37 | 5.50 | 5.67 | 5.72 |
| CO | 260 | 255 | 261 | 255 |

FIG. 8

| | Example 3-5 | Example 3-6 | Example 3-7 | Example 3-8 |
|---|---|---|---|---|
| Most upstream and most downstream plate members | — | — | — | — |
| Intermediate plate member | — | — | — | — |
| Coil-shaped wire (shaped) | — | — | — | — |
| Coil-shaped wire (swarf) | Ferritic stainless steel SUS430 | Austenitic stainless steel SUS316 | Austenitic stainless steel SUS31803 | Austenitic stainless steel SUS310S |
| Plate members identical in thickness | Austenitic stainless steel SUS316 | Austenitic stainless steel SUS316 | Austenitic stainless steel SUS316 | Austenitic stainless steel SUS316 |
| HC | 4.28 | 4.07 | 4.41 | 4.28 |
| NOx | 1.47 | 1.90 | 1.62 | 1.80 |
| HC+NOx | 5.75 | 5.97 | 6.04 | 6.07 |
| CO | 253 | 258 | 261 | 259 |

FIG. 9

| Mode number | 1 | 2 | 3 | 4 | 5 | 6 |
|---|---|---|---|---|---|---|
| Engine speed (rpm) | 3060 | 3060 | 3060 | 3060 | 3060 | 1750 |
| Torque (percent) | 100 | 75 | 50 | 25 | 10 | 0 |
| Weight coefficient | 0.09 | 0.2 | 0.29 | 0.3 | 0.07 | 0.05 |

EXHAUST PURIFYING APPARATUS

CROSS REFERENCE TO RELATED APPLICATIONS

This application is a Section 371 of International Application No. PCT/JP2016/056175, which was published on Feb. 9, 2017, under International Publication No. WO2017/022261, which claims priority to Japanese Application No. 2015-154826, filed on Aug. 5, 2015, each of which is incorporated herein by reference in its entirety.

TECHNICAL FIELD

The present invention relates to an exhaust purifying apparatus, specifically, an exhaust purifying apparatus that can be manufactured at low costs and is capable of exhibiting high exhaust purifying performance.

BACKGROUND ART

Conventionally, there exists an exhaust purifying apparatus including an exhaust passage and an exhaust purifying member disposed in the exhaust passage (for example, see Patent Document 1).

The exhaust purifying apparatus of this kind is advantageous in that the exhaust purifying member purifies exhaust, thereby preventing contamination of the surrounding environment.

In the exhaust purifying apparatus disclosed in Patent Document 1, the surface of a base member of the exhaust purifying member is covered with a catalyst coat containing a catalyst component. As the catalyst component, precious metal such as platinum, palladium, rhodium and the like is used.

PRIOR ART DOCUMENTS

Patent Documents

Patent Document 1: Japanese Patent Laid-open Publication No. 2012-217937 (see FIGS. 1 and 4)

SUMMARY OF THE INVENTION

Problems to be Solved by the Invention

<<Problem>> The manufacturing costs are high.

With the exhaust purifying apparatus disclosed in Patent Document 1, the surface of the base member is covered with the catalyst coat containing the catalyst component. Accordingly, it takes time and trouble to form the catalyst coat. Further, use of precious metal as the catalyst component incurs a high material cost. These are the factors of the high manufacturing costs.

An object of the present invention is to provide an exhaust purifying apparatus that can be manufactured at low costs and is capable of exhibiting high exhaust purifying performance.

As a result of study, the inventors of the present invention have found that, by employing the exhaust purifying member made of stainless steel, and dispensing with the catalyst coat containing the catalyst component for covering the surface of the stainless steel material, thereby bringing the surface of the stainless steel material into contact with exhaust, the exhaust can be purified with the surface of the stainless steel material. Thus, the inventors of the present invention have arrived at the present invention.

With any known exhaust purifying member, customarily the surface of the base member is covered with the catalyst coat containing the catalyst component. Even in the case where the base member is made of stainless steel, the catalyst coat is interposed between the surface of the stainless steel material and exhaust, and contact between them is avoided. Thus, the conventional technique never had a hint of the idea of purifying exhaust with the surface of the stainless steel material.

Solutions to the Problem

The inventive particular matter of an aspect of the invention according to claim 1 is as follows.

As exemplarily shown FIG. 1(B), FIG. 3(A) (B), and FIG. 4(A) (B) (D), an exhaust purifying apparatus includes an exhaust passage (1), and an exhaust purifying member (2) disposed in the exhaust passage (1). The exhaust purifying member (2) is made of stainless steel. The surface of the stainless steel material is not covered with a catalyst coat containing the catalyst component, so that the surface of the stainless steel material is brought into contact with exhaust (25).

Effects of the Invention (Aspect of the Invention According to Claim 1)

The aspect of the invention according to claim 1 exhibits the following effect.

<<Effect>> Low manufacturing costs are attained.

As exemplarily shown in FIG. 1(B), FIG. 3(A) (B), and FIG. 4(A) (B) (D), the exhaust purifying member (2) is made of stainless steel, and the surface of the stainless steel material is not covered with a catalyst coat containing a catalyst component and, therefore, the time and trouble taken for forming the catalyst coat are saved. Further, since use of precious metal being a catalyst component is not necessary, a low material cost is attained. From these factors, low manufacturing costs are attained.

<<Effect>> High exhaust purifying performance is exhibited.

Since the surface of the stainless steel material is brought into contact with exhaust (25), high exhaust purifying performance is exhibited.

The reason is assumed as follows.

That is, HC (hydrocarbon) in exhaust is combusted at the surface of the stainless steel material by high-temperature exhaust heat, whereby the content of HC in the exhaust reduces.

Further, the surface of the stainless steel material functions as a reducing catalyst, and NOx (nitrogen oxides) in exhaust is reduced at the surface of the stainless steel material by the high-temperature exhaust (25), to become a nitrogen component.

(Aspect of the Invention According to Claim 2)

The aspect of the invention according to claim 2 exhibits, in addition to the effect of the aspect according to claim 1, the following effect.

<<Effect>> High exhaust purifying performance is exhibited.

The exhaust purifying member (2) is made of precipitation hardening stainless steel and/or austenitic stainless steel. Since the stainless steel of this type exhibits high exhaust purifying function, high exhaust purifying performance is exhibited.

(Aspect of the Invention According to Claim 3)

The aspect of the invention according to claim 3 exhibits, in addition to the effect of the aspect according to one of claims 1 and 2, the following effect.

<<Effect>> High exhaust purifying performance is exhibited.

As exemplarily shown in FIG. 1(B) and FIG. 3(B), the exhaust purifying member (2) is structured by a plurality of plate members (2a) (2b) (2c) in the passage forming direction of the exhaust passage (1) while keeping a predetermined interval. As exemplarily shown in FIG. 1(D), the plate members (2a) (2b) (2c) each include an exhaust passing hole (28). Therefore, a turbulent flow is generated in exhaust (25) having passed through the exhaust passing hole (28). Thus, contact of exhaust (25) with the plate members (2b) (2c) on the exhaust downstream side is facilitated, whereby high exhaust purifying performance is exhibited.

<<Effect>> The exhaust noise can be attenuated.

By diffusion and mutual interference of exhaust (25) having passed through the exhaust passing hole (28) exemplarily shown in FIG. 1(D), exhaust noise can be attenuated.

(Aspect of the Invention According to Claim 4)

The aspect of the invention according to claim 4 exhibits, in addition to the effect of the aspect according to claim 3, the following effect.

<<Effect>> Fragments of the exhaust purifying member can be prevented from entering an upstream portion in exhaust.

As exemplarily shown FIG. 1(B), the plate member (2a) on the most exhaust upstream side is formed to be greater in thickness than a prescribed one of the plate members (2b) on the exhaust downstream side. Accordingly, the stiffness thereof is high and less prone to be broken. Even if the plate member (2b) on the exhaust downstream side is broken, the plate member (2a) receives the fragments of the plate member (2b). Thus, fragments of the exhaust purifying member (2) can be prevented from entering an upstream portion in exhaust.

(Aspect of the Invention According to Claim 5)

The aspect of the invention according to claim 5 exhibits, in addition to the effect of the aspect according to one of claims 3 and 4, the following effect.

<<Effect>> Fragments of the exhaust purifying member can be prevented from entering a downstream portion in exhaust.

As exemplarily shown in FIG. 1(B), the plate member (2c) on the most exhaust downstream side is formed to be greater in thickness than the plate member (2b) on the exhaust upstream side. Accordingly, the stiffness thereof is high and less prone to be broken. Even if the plate member (2b) on the exhaust upstream side is broken, the plate member (2c) receives the fragments of the plate member (2b). Thus, fragments of the exhaust purifying member (2) can be prevented from entering a downstream portion in exhaust.

(Aspect of the Invention According to Claim 6)

The aspect of the invention according to claim 6 exhibits, in addition to the effect of the aspect according to one of claims 3 to 5, the following effect.

<<Effect>> Fragments of the exhaust purifying member can be prevented from entering an upstream portion in exhaust.

As exemplarily shown in FIG. 1(B), the plate member (2a) on the most exhaust upstream side is made of precipitation hardening stainless steel. Stainless steel of this type is high in stiffness and, therefore, less prone to be broken. Even if the plate member (2b) on the exhaust downstream side is broken, the plate member (2a) receives the fragments of the plate member (2b). Thus, fragments of the exhaust purifying member (2) can be prevented from entering an upstream portion in exhaust.

<<Effect>> High exhaust purifying performance is exhibited.

As exemplarily shown in FIG. 1(B), the plate member (2a) on the most exhaust upstream side is made of precipitation hardening stainless steel. Stainless steel of this type is high in exhaust purifying function, and the plate member (2a) on the most exhaust upstream side is brought into contact with hydrocarbon or NOx in relatively high concentration before purified. Accordingly, high exhaust purifying performance is exhibited.

(Aspect of the Invention According to Claim 7)

The aspect of the invention according to claim 7 exhibits, in addition to the effect of the aspect according to one of claims 3 to 6, the following effect.

<<Effect>> Fragments of the exhaust purifying member can be prevented from entering a downstream portion in exhaust.

As exemplarily shown in FIG. 1(B), the plate member (2c) on the most exhaust downstream side is made of precipitation hardening stainless steel. Stainless steel of this type is high in stiffness and, therefore, less prone to be broken. Even if the plate member (2b) on the exhaust upstream side is broken, the plate member (2c) receives the fragments of the plate member (2b). Thus, fragments of the exhaust purifying member (2) can be prevented from entering a downstream portion in exhaust.

<<Effect>> High exhaust purifying performance is exhibited.

As exemplarily shown in FIG. 1(B), the plate member (2c) on the most exhaust downstream side is made of precipitation hardening stainless steel. Stainless steel of this type is high in exhaust purifying function. Since the plate member (2c) on the most exhaust downstream side is brought into contact with high-temperature exhaust (25) increased in temperature by combustion heat of HC on the upstreamside, high exhaust purifying performance is exhibited.

(Aspect of the Invention According to Claim 8)

The aspect of the invention according to claim 8 exhibits, in addition to the effect of the aspect according to one of claims 3 to 7, the following effect.

<<Effect>> High exhaust purifying performance is exhibited.

As exemplarily shown in FIG. 1(B) and FIG. 3(B), a predetermined one of the plate members (2b) on the exhaust downstream side is made of austenitic stainless steel. Stainless steel of this type is high in exhaust purifying function. Therefore, when a turbulent flow is generated in exhaust (25) having passed through the exhaust passing hole (28) of the plate member (2a) on the exhaust upstream side or the plate member (2b), contact of exhaust (25) with the plate member (2b) on the exhaust downstream side is facilitated. Thus, high exhaust purifying performance is exhibited.

(Aspect of the Invention According to Claim 9)

The aspect of the invention according to claim 9 exhibits, in addition to the effect of the aspect according to one of claims 1 and 2, the following effect.

<<Effect>> High exhaust purifying performance is exhibited.

As exemplarily shown in FIG. 1(B) and FIG. 3(A) (B), the exhaust purifying member (2) includes a wire member (2d) interposed in the exhaust passage (1). This increases the surface area of the exhaust purifying member (2), and the contact area between exhaust (25) and the exhaust purifying member (2) increases. Thus, high exhaust purifying performance is exhibited.

<<Effect>> Exhaust noise can be attenuated.

By the muffling effect exhibited by the wire member (2d) exemplarily shown in FIG. 1(B) and FIG. 3(A) (B), exhaust noise can be attenuated.

(Aspect of the Invention According to Claim 10)

The aspect of the invention according to claim 10 exhibits, in addition to the effect of the aspect according to claim 9, the following effect.

<<Effect>> An increase in back pressure can be suppressed.

As exemplarily shown in FIG. 1(B), and FIG. 3(A) (B), the wire member (2d) is wound to be coil-shaped. Accordingly, exhaust (25) smoothly pass inside the coil-shaped wire member (2d), a reduced passing resistance of exhaust (25). Thus, an increase in back pressure can be suppressed.

(Aspect of the Invention According to Claim 11)

The aspect of the invention according to claim 11 exhibits, in addition to the effect of the aspect according to one of claims 9 and 10, the following effect.

<<Effect>> High exhaust purifying performance is exhibited.

As exemplarily shown in FIG. 1(B) and FIG. 3(B), the exhaust purifying member (2) includes the plurality of plate members (2a) (2b) (2c) made of stainless steel and the wire member (2d) made of stainless steel. The plate members (2a) (2b) (2c) are disposed in the passage forming direction of the exhaust passage (1) while keeping a predetermined interval. As exemplarily shown in FIG. 1(D), the plate members (2a) (2b) (2c) each include the exhaust passing hole (28). The wire member (2d) is interposed between adjacent ones of the plate members (2a) (2b) (2c). Accordingly, the surface area of the exhaust purifying member (2) increases, and the contact area between exhaust (25) and the exhaust purifying member (2) increases. Thus, high exhaust purifying performance is exhibited.

<<Effect>> Exhaust noise can be attenuated.

By diffusion and mutual interference of exhaust (25) having passed through the exhaust passing hole (28) exemplarily shown in FIG. 1(D), and further by the muffling effect of the wire member (2d), exhaust noise can be attenuated.

(Aspect of the Invention According to Claim 12)

The aspect of the invention according to claim 12 exhibits, in addition to the effect of the aspect according to one of claims 1 and 2, the following effect.

<<Effect>> High exhaust purifying performance is exhibited.

As exemplarily shown in FIG. 4(A) (B) (D), the exhaust purifying member (2) includes a spirally rolled plate member (2j) made of stainless steel and having a central axis (2i) in the passage forming direction of the exhaust passage (1). As exemplarily shown in FIG. 4(B) (D), inside the spirally rolled plate member (2j), an exhaust passing clearance (2k) spirally rolled along the surface of the spirally rolled plate member (2j) is formed. This increases the surface area of the exhaust purifying member (2), and the contact area between exhaust (25) and the exhaust purifying member (2) increases. Thus, high exhaust purifying performance is exhibited.

(Aspect of the Invention According to Claim 13)

The aspect of the invention according to claim 13 exhibits, in addition to the effect of the aspect according to claim 12, the following effect.

<<Effect>> High exhaust purifying performance is exhibited.

As exemplarily shown in FIG. 4(A), the spirally rolled plate member (2j) is provided with an exhaust passing hole (30) that penetrates in the thickness direction. Thus, a turbulent flow is generated in exhaust (25) having passed through the exhaust passing hole (30), and contact of exhaust (25) with the surface of the plate member (2j) on the exhaust downstream side is facilitated. Thus, high exhaust purifying performance is exhibited.

<<Effect>> Exhaust noise can be attenuated.

By diffusion and mutual interference of exhaust (25) having passed through the passing hole (30), exhaust noise can be attenuated.

(Aspect of the Invention According to Claim 14)

The aspect of the invention according to claim 14 exhibits, in addition to the effect of the aspect according to claim 13, the following effect.

<<Effect>> High exhaust purifying performance can be maintained.

As exemplarily shown in FIG. 4(D), the spirally rolled plate member (2j) is provided with a spacer projection (31) projecting from its surface. The spacer projection (31) retains the exhaust passing clearance (2k). Accordingly, against heat load applied to the spirally rolled plate member (2j), the exhaust passing clearance (2k) is maintained in a certain state, and exhaust (25) smoothly passes therethrough. Thus, high exhaust purifying performance can be maintained.

(Aspect of the Invention According to Claim 15)

The aspect of the invention according to claim 15, in addition to the effect of the aspect according to claim 4, the following effect.

<<Effect>> High exhaust purifying performance is exhibited.

As exemplarily shown in FIG. 4(E) (F), the spacer projection (31) includes an exhaust passing port (32). Exhaust (25) that passes through the exhaust passing clearance (2k) of the spirally rolled plate member (2j) diffuses into the exhaust passing clearance (2k) adjacent thereto in the radial direction via the exhaust passing port (32). Thus, contact of exhaust (25) with the surface of the plate member (2j) is facilitated, whereby high exhaust purifying performance is exhibited.

<<Effect>> Exhaust noise can be attenuated.

By diffusion and mutual interference of exhaust (25) having passed through the exhaust passing port (32) exemplarily shown in FIG. 4(E) (F), exhaust noise can be attenuated.

(Aspect of the Invention According to Claim 16)

The aspect of the invention according to claim 16 exhibits, in addition to the effect of the aspect according to one of claims 1 to 15, the following effect.

<<Effect>> Exhaust can be collectively purified inside the cylindrical part of the holder.

As exemplarily shown in FIG. 1(A) (B), FIG. 3(A) (B), and FIG. 4(A), the holder (3) includes a cylindrical part (3a). An exhaust inlet (12) is opened at the circumferential wall of the cylindrical part (3a) for introducing exhaust from a plurality of branch parts (5) (6). The exhaust purifying member (2) is disposed inside the cylindrical part (3a) of the holder (3). Thus, exhaust (23) (24) introduced from the plurality of branch parts (5) (6) can be collectively purified inside the cylindrical part (3a) of the holder (3).

<<Effect>> Exhaust purifying efficiency of the exhaust purifying member can be improved.

As exemplarily shown in FIGS. 1(A)(B), FIG. 3(A) (B), and FIG. 4(A), the holder (3) includes the cylindrical part (3a). The cylindrical part (3a) is disposed inside the collector part (4) of the exhaust manifold (27). The exhaust purifying member (2) is disposed inside the cylindrical part (3a) of the holder (3). Accordingly, by virtue of the double-cylinder structure made up of the collector part (4) and the cylindrical part (3a) of the holder (3), temperature of exhaust (25) passing through the exhaust purifying member (2) is less prone to reduce, and the exhaust purifying efficiency of the exhaust purifying member (2) improves.

(Aspect of the Invention According to Claim 17)

The aspect of the invention according to claim 17 exhibits, in addition to the effect of the aspect according to claim 16, the following effect.

<<Effect>> Exhaust processing member is strongly supported.

As exemplarily shown in FIG. 1(A) (B), FIG. 3(A) (B), and FIG. 4(A), a flange part (3b) of the holder (3) is fixed to the basal end portion (4b) of the collector part (4). Accordingly, the pressure of exhaust (25) applied to the exhaust purifying member (2) is received by the basal end portion (4b) of the collector part (4) via the flange part (3b) of the holder (3). Thus, the exhaust purifying member (2) is strongly supported at the collector part (4).

(Aspect of the Invention According to Claim 18)

The aspect of the invention according to claim 18 exhibits, in addition to the effect of the aspect according to claim 17, the following effect.

<<Effect>> Maintenance or replacement of the exhaust purifying member is facilitated.

As exemplarily shown in FIG. 1(A) (B), FIG. 3(A) (B), and FIG. 4(A), the flange part (3b) of the holder (3) is removably mounted on the basal end portion (4b) of the collector part (4). Accordingly, the exhaust purifying member (2) together with the holder (3) can be easily extracted from or inserted into the collector part (4). Thus, maintenance or replacement of the exhaust purifying member (2) is facilitated.

(Aspect of the Invention According to Claim 19)

The aspect of the invention according to claim 19 exhibits, in addition to the effect of the aspect according to one of claims 17 and 18, the following effect.

<<Effect>> With a lid part, closing the holder insertion port and mounting the holder on the collector part can be simultaneously performed.

As exemplarily shown in FIG. 1(A) (B), FIG. 3(A) (B), and FIG. 4(A), the flange part (3b) is structured by the circumferential portion of a lid part (11) provided on the basal end side of the holder (3), and the lid part (11) closes the holder insertion port (7). Accordingly, with the lid part (11), closing the holder insertion port (7) and mounting the holder (3) on the collector part (4) can be simultaneously performed.

(Aspect of the Invention According to Claim 20)

The aspect of the invention according to claim 20 exhibits, in addition to the effect of the aspect according to one of claims 16 to 19, the following effect.

<<Effect>> Exhaust processing member is strongly supported.

As exemplarily shown FIG. 1(A) (B), FIG. 3(A) (B), and FIG. 4(A), the circumferential wall of the exhaust purifying member (2) is fitted from inside with a tip portion (4a) of the collector part (4). While the engine is in operation, thermal expansion of the circumferential wall of the exhaust purifying member (2) presses the circumferential wall of the exhaust purifying member (2) against the circumferential wall of the tip portion (4a) of the collector part (4). Accordingly, the pressure of exhaust (25) applied to the exhaust purifying member (2) is received by the tip portion (4a) of the collector part (4) via the circumferential wall of the exhaust purifying member (2). Thus, the exhaust purifying member (2) is strongly supported.

(Aspect of the Invention According to Claim 21)

The aspect of the invention according to claim 21 exhibits, in addition to the effect of the aspect according to one of claims 16 to 20, the following effect.

<<Effect>> High exhaust purifying performance is exhibited.

The surface of the stainless steel material is brought into contact with exhaust (25). Thus, high exhaust purifying performance is exhibited.

The reason is assumed as follows.

That is, HC (hydrocarbon) in exhaust is combusted at the surface of the stainless steel material by high-temperature exhaust heat, whereby the content of HC in the exhaust reduces.

Further, the surface of the stainless steel material functions as a reducing catalyst, and NOx (nitrogen oxides) in exhaust is reduced at the surface of the stainless steel material by the high-temperature exhaust (25), to become a nitrogen component.

BRIEF DESCRIPTION OF THE DRAWINGS

FIG. 1 is a diagram for describing an engine including an exhaust purifying apparatus according to a first embodiment of the present invention, in which FIG. 1(A) is a side view of an exhaust manifold, FIG. 1(B) is a longitudinal sectional side view of FIG. 1(A), FIG. 1(C) is a rear view of a lid as seen from the basal end side of a collector part, and FIG. 1(D) is a front view of a plate member.

FIG. 3 is a diagram for describing an engine including an exhaust purifying apparatus according to second and third embodiments of the present invention, wherein FIG. 3(A) is a diagram corresponding to FIG. 1(B) of the second embodiment, and FIG. 3(B) is a diagram corresponding to FIG. 1(B) of the third embodiment.

FIG. 4 is a diagram for describing an engine including an exhaust purifying apparatus according to fourth and fifth embodiments of the present invention, in which FIG. 4(A) is a diagram corresponding to FIG. 1(B) of the fourth embodiment, FIG. 4(B) is a diagram showing a spirally rolled plate member fitted from inside with a tip-side cylindrical part used in the fourth embodiment as seen from the tip side, FIG. 4(C) is a diagram corresponding to FIG. 1(C) of the fourth embodiment, FIG. 4(D) is a diagram corresponding to FIG. 4(B) according to the fifth embodiment, FIG. 4(E) is an enlarged plan view in which a spirally rolled plate member used in the fifth embodiment is developed, FIG. 4(F) is an enlarged sectional view of the plate member in FIG. 4(E).

FIG. 5 is a table showing the components and composition of stainless steel that can be suitably used with an exhaust purifying member according to the embodiments of the present invention.

FIG. 6 is a table showing stainless steel used for the main part of the exhaust purifying member according to Example 1, Examples 2-1 to 2-3 of the present invention and Comparative Examples 1, 2 and the experimental results.

FIG. 7 is a table showing stainless steel used for the main part of the exhaust purifying member according to Examples 3-1 to 3-4 of the present invention and the experimental results.

FIG. 8 is a table showing stainless steel used for the main part of the exhaust purifying member according to Examples 3-5 to 3-8 of the present invention and the experimental results.

FIG. 9 is a table showing a test method of Experimental Example of the present invention.

EMBODIMENTS OF THE INVENTION

Figure 1:
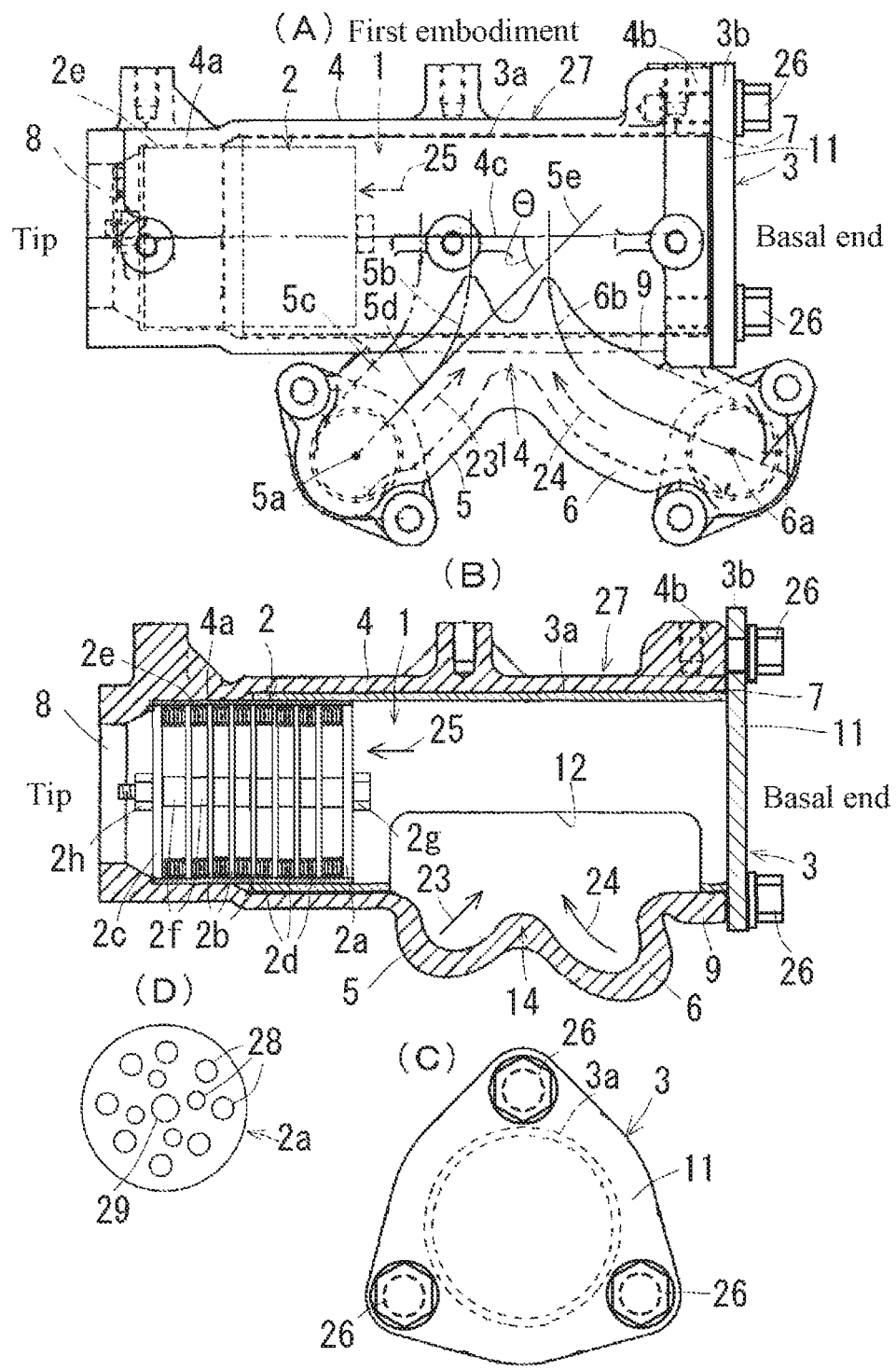
Figure 2:
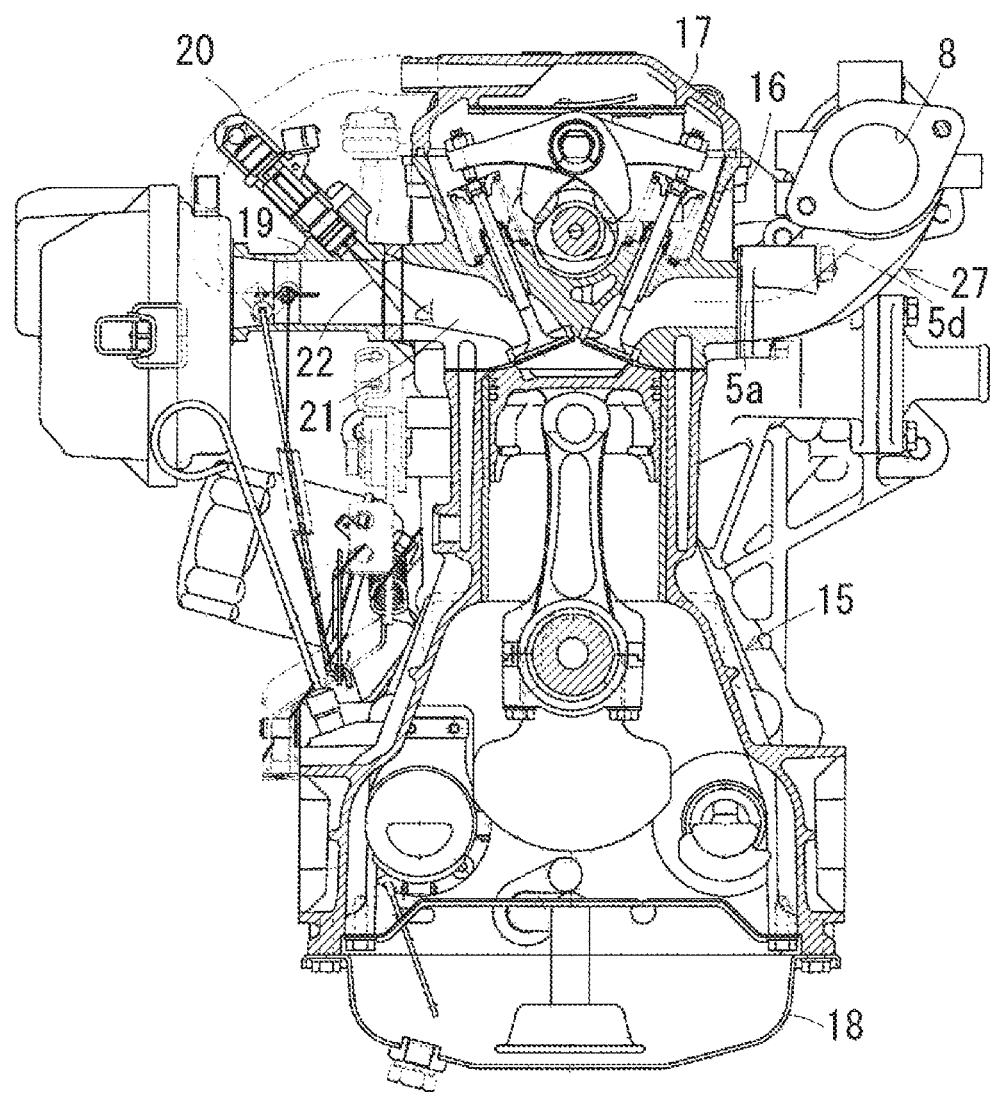
FIG. 2 is a longitudinal front view of the engine including the exhaust purifying apparatus according to the first embodiment of the present invention.
Figure 4:
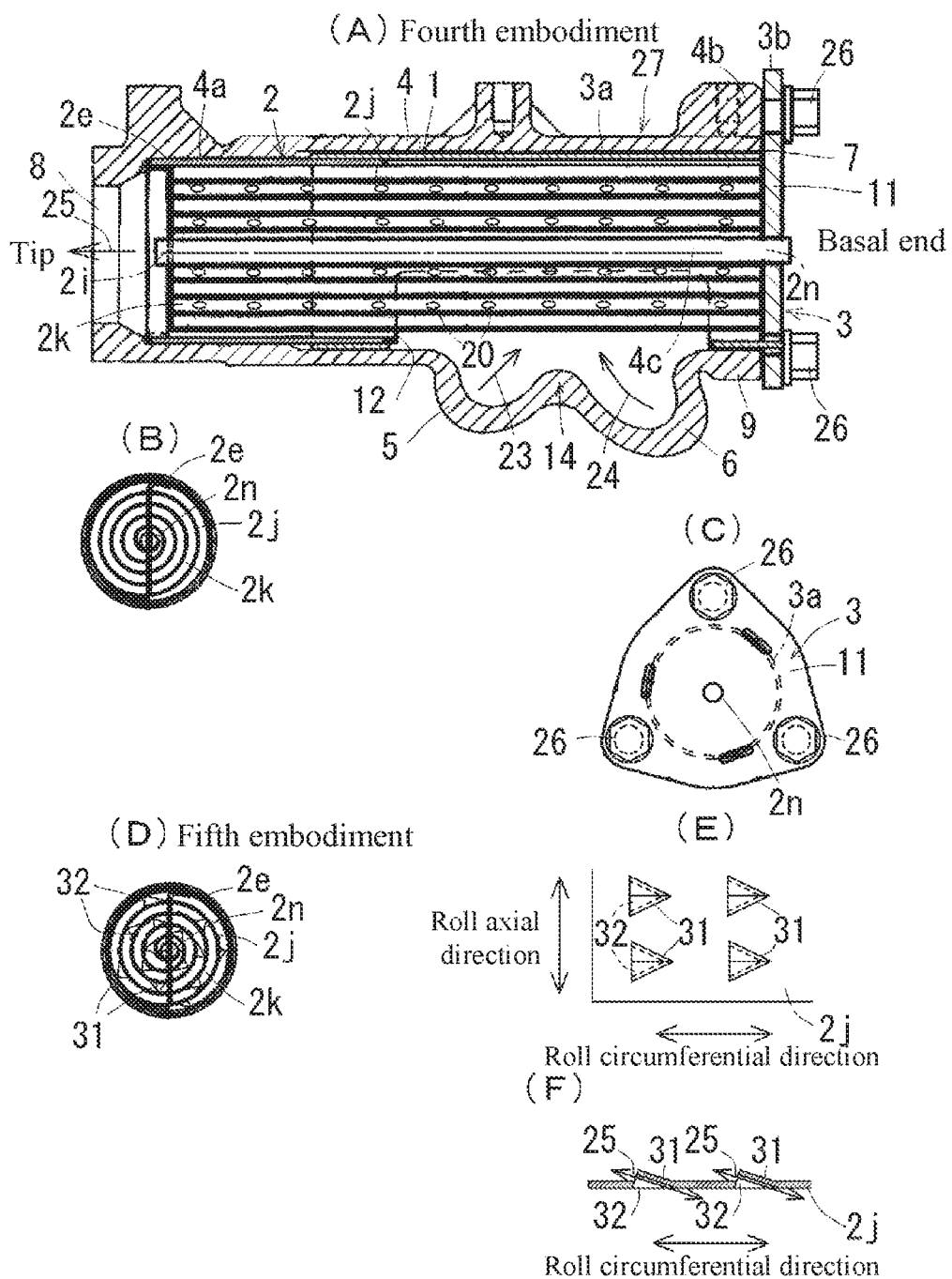

FIGS. 1 and 2 are each a diagram describing an engine including an exhaust purifying apparatus according to a first embodiment of the present invention. FIG. 3 is a diagram describing an engine including an exhaust purifying apparatus according to second and third embodiments of the present invention. FIG. 4 is a diagram describing an engine including an exhaust purifying apparatus according to fourth and fifth embodiments of the present invention. In each of the embodiments, a description will be given of a water-cooled vertical straight twin spark engine including an exhaust purifying apparatus.

A description will be given of the first embodiment shown in FIGS. 1 and 2.

The engine is summarized as follows.

As shown in FIG. 2, a cylinder head (16) is mounted on an upper part of a cylinder block (15). A cylinder head cover (17) is mounted on an upper part of the cylinder head (16). An oil pan (18) is mounted on a lower part of the cylinder block (15).

On one lateral side of the cylinder head (16), a throttle body (19) is mounted. On other lateral side thereof, an exhaust manifold (24) is mounted. A fuel injector (20) is mounted on the throttle body (19), so that fuel (22) is injected from the fuel injector (20) into an intake port (21) in the cylinder head (16). The fuel (22) is gasoline.

The exhaust purifying apparatus is structured as follows.

As shown in FIG. 1(A) (B), the exhaust purifying apparatus includes an exhaust manifold (27) of the engine and a holder (3). The exhaust manifold (27) structuring an exhaust passage (1) includes a collector part (4) and a plurality of (two) branch parts (5) (6). The collector part (4) is a cylindrical element. An exhaust outlet (8) is opened at a tip portion of the collector part (4). The plurality of (two) branch parts (5) (6) extend from the basal end-side circumferential wall (9) of the collector part (4).

The holder (3) includes a cylindrical part (3a). The cylindrical part (3a) is disposed in the collector part (4) of the exhaust manifold (27). An exhaust inlet (12) is opened at a circumferential wall of the cylindrical part (3a) for introducing exhaust from the plurality of branch parts (5) (6).

The exhaust purifying member (2) has its part on the holder (3) side disposed inside the cylindrical part (3a) of the holder (3).

Thus, the holder (3) includes the cylindrical part (3a). The exhaust inlet (12) is opened at the circumferential wall of the cylindrical part (3a) for introducing exhaust from the plurality of branch parts (5) (6). The exhaust purifying member (2) is disposed inside the cylindrical part (3a) of the holder (3). Accordingly, exhaust (23) (24) introduced from the plurality of branch parts (5) (6) can be collectively purified inside the cylindrical part (3a) of the holder (3).

Further, the holder (3) includes the cylindrical part (3a). The cylindrical part (3a) is fitted from inside with the collector part (4) of the exhaust manifold (27). The exhaust purifying member (2) has its part disposed inside the cylindrical part (3a) of the holder (3). Accordingly, by virtue of the double-cylinder structure made up of the collector part (4) and the cylindrical part (3a) of the holder (3), the temperature of exhaust (25) passing through the exhaust purifying member (2) is less prone to reduce, and the exhaust purifying efficiency of the exhaust purifying member (2) improves.

As shown in FIG. 1(A) (B), a holder insertion port (7) is opened at a basal end portion (4b) of the collector part (4). The holder (3) includes a flange part (3b) provided on the basal end side relative to the cylindrical part (3a).

The cylindrical part (3a) of the holder (3) on which the exhaust purifying member (2) is mounted is inserted from the holder insertion port (7) of the collector part (4). The flange part (3b) of the holder (3) is fixed to the basal end portion (4b) of the collector part (4). Accordingly, the pressure of exhaust (25) applied to the exhaust purifying member (2) is received by the basal end portion (4b) of the collector part (4) via the flange part (3b). Thus, the exhaust purifying member (2) is strongly supported at the collector part (4).

As shown in FIG. 1(A) (B), the flange part (3b) of the holder (3) is removably mounted on the basal end portion (4b) of the collector part (4). Accordingly, the exhaust purifying member (2) together with the holder (3) can be easily extracted from or inserted into the collector part (4). Thus, maintenance or replacement of the exhaust purifying member (2) is facilitated.

The flange part (3b) is structured by a circumferential portion of a lid part (11) provided on the basal end side of the holder (3). The lid part (11) closes the holder insertion port (7). Accordingly, with the lid part (11), closing the holder insertion port (7) and mounting the holder (3) on the collector part (4) can be simultaneously performed.

As shown in FIG. 1(A) (B), the collector part (4) of the exhaust manifold (27) and the cylindrical part (3a) of the holder (3) are each a straight circular cylindrical element. The exhaust manifold (27) and the lid part (11) are each a cast of cast iron. The lid part (11) is fixed to the basal end part (4b) of the collector part (4) with three bolts (26).

As shown in FIG. 1(B), the circumferential wall of the exhaust purifying member (2) is fitted from inside with a tip portion (4a) of the collector part (4). While the engine is in operation, thermal expansion of the circumferential wall of the exhaust purifying member (2) presses the circumferential wall of the exhaust purifying member (2) against the circumferential wall of the tip portion (4a) of the collector part (4). Accordingly, the pressure of exhaust (25) applied to the exhaust purifying member (2) is received by the tip portion (4a) of the collector part (4) via the circumferential wall of the exhaust purifying member (2). Thus, the exhaust purifying member (2) is strongly supported at the collector part (4).

As shown in FIG. 1(A), the adjacent branch parts (5) (6) are merged with each other while approaching toward the collector part (4). As seen in a direction parallel to one of entrance opening central axes (5a) (6a) of their respective branch parts (5) (6), at a merging portion (14) of the adjacent branch parts (5) (6), merging portion central axes (5b) (6b) of their respective branch parts (5) (6) are curved, and directed to gradually become parallel to each other as becoming nearer to the collector part (4). Thus, the exhaust purifying performance of the exhaust purifying member (2) is high. The reason thereof is assumed as follows. That is, exhaust (23) (24) directed toward the collector part (4) from the adjacent branch parts (5) (6) mildly join with each other at the merging portion (14) of the branch parts (5) (6). This suppresses disadvantageous increase in back pressure upon generation of a turbulent flow which may otherwise occur due to harsh impact of exhaust (23) (24). Thus, the flow of exhaust (25) that passes through the exhaust purifying member (2) becomes smooth.

As shown in FIG. 1(A), as seen in a direction parallel to the entrance opening central axes (5a) (6a) of their respective branch parts (5) (6), out of the plurality of (two) branch parts (5) (6), an entrance-side portion (5c) of the branch part (5) being nearest to the exhaust purifying member (2) includes an entrance-side central axis (5d). It is assumed that there exists an extended central axis (5e) which is obtained by extending the entrance-side central axis (5d) straight to the collector part (4).

In an intersecting angle at an intersection portion between the extended central axis (5e) and the central axis (4c) of the collector part (4), an intersecting angle (Θ) positioned on the exhaust purifying member (2) side and on the branch parts (5) (6) side is set to 45°. This intersecting angle (Θ) is preferably set to fall within a range from 35° to 55°.

In the case where the entrance opening central axes (5a) (6a) of their respective branch parts (5) (6) are not parallel to each other, the extended central axis (5e) is assumed to exist in parallel to one of the entrance opening central axes (5a) (6a).

With the setting as described above, the exhaust purifying performance of the exhaust purifying member (2) is high.

The reason thereof is assumed as follows. That is, when the intersecting angle (Θ) becomes less than 35°, in the vector component of exhaust (23) flowing into the collector part (4) from the branch part (5) nearest to the exhaust purifying member (2), the vector component in the direction becoming far from the exhaust purifying member (2) along the central axis (4c) of the collector part (4) becomes excessively great. This hinders exhaust (24) from flowing into the collector part (4) from the other branch part (6), and increases the back pressure. Further, this slows down the flow of exhaust (25) passing through the exhaust purifying member (2), and reduces the exhaust purifying performance of the exhaust purifying member (2).

On the other hand, when the intersecting angle (Θ) exceeds 55°, in the above-described vector component of exhaust (23), the vector component in the direction becoming far from the branch part (5) along the radial direction of the collector part (4) becomes excessively great and the exhaust unevenly flows into the exhaust purifying member (2) from a portion far from the branch part (5). This reduces the passing area of exhaust (25) passing through the exhaust purifying member (2), and reduces the exhaust purifying performance of the exhaust purifying member (2).

The exhaust purifying member (2) is structured as follows.

As shown in FIG. 1(B), the exhaust purifying member (2) is structured by a cylindrical member (2e), a plurality of plate members (2a) (2b) (2c), and a wire member (2d). The cylindrical member (2e) is a straight circular cylindrical element. The plurality of plate members (2a) (2b) (2c) are disposed inside the cylindrical member (2e) in the central axis direction of the cylindrical member (2e) while keeping a predetermined interval. The central axis of the cylindrical member (2e) is set along the central axis (4c) of the collector part (4) being the passage forming direction of the exhaust passage (1). The plurality of plate members (2a) (2b) (2c) keep a predetermined interval in the passage forming direction of the exhaust passage (1). As exemplarily shown in FIG. 1(D), the plate members (2a) (2b) (2c) each include exhaust passing holes (28). The wire member (2d) is disposed along the inner circumferential surface of the cylindrical member (2e) among the plurality of plate members (2a) (2b) (2c). The wire member (2d) is wound to be coil-shaped. The wire member (2d) is obtained by shaping a straight wire member (2d) made of stainless steel into a coil.

As shown in FIG. 1(B), the plate member (2a) on the most exhaust upstream side is fixed to the cylindrical member (2e) by welding, and other plate members (2b) (2c) are respectively spaced apart from the upstream-side plate members (2a) (2b) with spacer ring members (2f). The plate members (2a) (2b) (2c) and the spacer ring members (2f) are fixed to the cylindrical member (2e) by a mounting bolt (2g) penetrating through the plate members (2a) (2b) (2c) and a mounting nut (2h) screwed to the tip of the mounting bolt (2g) being tightened.

The plurality of plate members (2a) (2b) (2c) are structured by the plate member (2a) on the most exhaust upstream side, the plate member (2c) on the most exhaust downstream side, and the plate member (2b) at the intermediate position. The number of the plate member (2b) at the intermediate position may be arbitrarily set.

FIG. 1(D) shows the front view of the plate member (2a) on the most exhaust upstream side. The plate member (2a) includes, at its center, a bolt insertion hole (29) into which the mounting bolt (2g) is inserted. The plate member (2a) further includes, around the bolt insertion hole (29), four small-diameter exhaust passing holes (28). The plate member (2a) includes, on the outer circumference side of the exhaust passing holes (28), eight large-diameter exhaust passing holes (28). The front view of the plate member (2c) on the most exhaust downstream side and that of the plate member (2b) at the intermediate position are also identical to the front view of the plate member (2a). The plate members (2a) (2b) (2c) are each circular plate-shaped.

As shown in FIG. 1(B), the plate member (2a) on the most exhaust upstream side is formed to be thicker than the plate member (2b) at the intermediate position which is downstream to the plate member (2a). Further, the plate member (2c) on the most exhaust downstream side is formed to be thicker than the plate member (2b) at the intermediate position which is upstream to the plate member (2c).

The plate member (2a) on the most exhaust upstream side and the plate member (2c) on the most exhaust downstream side are formed to be identical in thickness.

The cylindrical member (2e), the plurality of plate members (2a) (2b) (2c), and the wire member (2d) being the constituent components of the exhaust purifying member (2), and the cylindrical part (3a) of the holder (3) shown in FIG. 1(B) are each made of stainless steel. The surface of the stainless steel material is not covered with a catalyst coat containing a catalyst component (precious metal such as platinum, palladium, rhodium and the like), so that the surface of the stainless steel material is brought into contact with exhaust (25). That is, the surface of the stainless steel material of the exhaust purifying member (2) and the cylindrical part (3a) of the holder (3) is exposed to the exhaust passage (1), so that the surface of the stainless steel material is brought into contact with exhaust (25).

The spacer ring members (2f), the mounting bolt (2g), and the mounting nut (2h) that retain the plurality of plate members (2a) (2b) (2c) inside the cylindrical member (2e) are made of heat resistant steel.

The cylindrical member (2e) being the constituent component of the exhaust purifying member (2) and the cylindrical part (3a) of the holder (3) shown in FIG. 1(B) are desirably made of ferritic stainless steel in view of costs and heat resistance. These components may also be made of any of various types of stainless steel such as precipitation hardening stainless steel, austenitic stainless steel, and martensitic stainless steel.

The plurality of plate members (2a) (2b) (2c) and the wire member (2d) are desirably made of any of various types of stainless steel such as precipitation hardening stainless steel and austenitic stainless steel for their high exhaust purifying function.

These components may also be made of any of various types of stainless steel such as martensitic stainless steel and ferritic stainless steel.

The cylindrical member (2e) and the cylindrical part (3a) of the holder (3) are made of ferritic stainless steel.

The plate members (2a) (2c) respectively on the most exhaust upstream side and the most exhaust downstream side are made of precipitation hardening stainless steel, and the plate member (2b) at the intermediate position and the wire member (2d) are made of austenitic stainless steel.

One or both of the cylindrical member (2e) and the cylindrical part (3a) of the holder (3) may be made of any of various types of stainless steel such as precipitation hardening stainless steel, austenitic stainless steel, martensitic stainless steel and ferritic stainless steel.

One or both of the plate members (2a) (2c) respectively on the most exhaust upstream side and the most exhaust downstream side may be made of any of various types of stainless steel such as precipitation hardening stainless steel, austenitic stainless steel, martensitic stainless steel and ferritic stainless steel.

Further, the whole or part of the plate member (2b) at the intermediate position, and the whole or part of the wire member (2d) may be made of any of various types of stainless steel such as precipitation hardening stainless steel, austenitic stainless steel, martensitic stainless steel and ferritic stainless steel.

Next, a description will be given of the second embodiment shown in FIG. 3(A).

In the second embodiment, the constituent components of the exhaust purifying member (2) are the cylindrical member (2e) and the wire member (2d). The wire member (2d) is housed in the cylindrical part (3a) of the holder (3) inserted into the collector part (4) of the exhaust manifold (27). The wire member (2d) is wound to be coil-shaped. The wire member (2d) is obtained by shaping a straight wire member (2d) made of stainless steel into a coil. As to the cylindrical member (2e) and the wire member (2d) of the exhaust purifying member (2) and the cylindrical part (3a) of the holder (3) also, the surface of the stainless steel material is not covered with a catalyst coat containing a catalyst component, so that the surface of the stainless steel material is brought into contact with exhaust (25). That is, the surface of the stainless steel material of the exhaust purifying member (2) and the cylindrical part (3a) of the holder (3) are exposed to the exhaust passage (1), so that the surface of the stainless steel material is brought into contact with exhaust (25).

The wire member (2d) is desirably made of any of various types of stainless steel such as precipitation hardening stainless steel and austenitic stainless steel for their high exhaust purifying function.

The wire member (2d) may be made of any of various types of stainless steel such as martensitic stainless steel and ferritic stainless steel.

The wire member (2d) is made of precipitation hardening stainless steel.

The whole or part of the wire member (2d) may be made of any of various types of stainless steel such as precipitation hardening stainless steel, austenitic stainless steel, martensitic stainless steel and ferritic stainless steel.

The rest of the structure is identical to the first embodiment shown in FIG. 1(A) to (C). In FIG. 3(A), any element identical to that in the first embodiment is denoted by the identical reference character used in FIG. 1(A) to (C).

Next, a description will be given of the third embodiment shown in FIG. 3(B).

In the third embodiment, the constituent components of the exhaust purifying member (2) are the cylindrical member (2e), the three plate members (2a) (2b) (2c) being identical in thickness to each other, and the wire member (2d). The three plate members (2a) (2b) (2c) are disposed inside the cylindrical part (3a) of the holder (3) in the central axis direction of the collector part (4) while keeping a predetermined interval. The wire member (2d) is interposed between adjacent ones of the plate members (2a) (2b) (2c), between the plate member (2a) on the most upstream side and the lid part (11), and at a position downstream to the plate member (2c) on the most downstream side. The wire member (2d) is wound to be coil-shaped. The wire member (2d) is made of swarf obtained by cutting stainless steel.

The cylindrical member (2e), the three plate members (2a) (2b) (2c), and the wire member (2d) of the exhaust purifying member (2), and the cylindrical part (3a) of the holder (3) are also made of stainless steel. The surface of the stainless steel material is not covered with a catalyst coat containing a catalyst component, so that the surface of the stainless steel material is brought into contact with exhaust (25). That is, the surface of the stainless steel material of the exhaust purifying member (2) and the cylindrical part (3a) of the holder (3) is exposed to the exhaust passage (1), so that the surface of the stainless steel material is brought into contact with exhaust (25).

The three plate members (2a) (2b) (2c) and the wire member (2d) are desirably made of any of various types of stainless steel such as precipitation hardening stainless steel and austenitic stainless steel for their high exhaust purifying function.

The three plate members (2a) (2b) (2c) and the wire member (2d) may be made of any of various types of stainless steel such as martensitic stainless steel and ferritic stainless steel.

The three plate members (2a) (2b) (2c) and the wire member (2d) are made of precipitation hardening stainless steel.

The whole or part of the three plate members (2a) (2b) (2c) may be made of any of various types of stainless steel such as precipitation hardening stainless steel, austenitic stainless steel, martensitic stainless steel and ferritic stainless steel.

Further, the whole or part of the wire member (2d) may be made of any of various types of stainless steel such as precipitation hardening stainless steel, austenitic stainless steel, martensitic stainless steel and ferritic stainless steel.

The rest of the structure is identical to the first embodiment shown in FIG. 1(A) to (D). In FIG. 3(B), any element identical to that in the first embodiment is denoted by the identical reference character used in FIG. 1(A) to (D).

Next, a description will be given of the fourth embodiment shown in FIG. 4(A) (B) (C).

As shown in FIG. 4(A), in the fourth embodiment, the exhaust purifying member (2) is structured by the cylindrical member (2e), a spirally rolled plate member (2j), and a core member (2n). The spirally rolled plate member (2j) is disposed inside the cylindrical part (3a) of the holder (3) along the central axis direction of the cylindrical part (3a).

The cylindrical part (3a) of the holder (3) and the cylindrical member (2e) are disposed along the central axis (4c) of the collector part (4) being the passage forming direction of the exhaust passage (1), and the central axis (2i) of the spirally rolled plate member (2j) is directed in the passage forming direction of the exhaust passage (1). As shown in FIG. 4(B), inside the spirally rolled plate member (2j), the exhaust passing clearance (2k) spirally rolled along the surface of the plate member (2j) is formed. As shown in FIG. 4(A), the spirally rolled plate member (2j) is provided with exhaust passing holes (30) that penetrate in the thickness direction. At the center of the spirally rolled plate member (2j), the core member (2n) is disposed.

The cylindrical member (2e), the spirally rolled plate member (2j), and the core member (2n) of the exhaust purifying member (2) and the cylindrical part (3a) of the holder (3) are also made of stainless steel. The surface of the stainless steel material is not covered with a catalyst coat containing a catalyst component, so that the surface of the stainless steel material is brought into contact with exhaust (25). That is, the surface of the stainless steel material of the exhaust purifying member (2) and the cylindrical part (3a) of the holder (3) is exposed to the exhaust passage (1), so that the surface of the stainless steel material is brought into contact with exhaust (25).

The spirally rolled plate member (2j) and the core member (2n) are desirably made of any of various types of stainless steel such as austenitic stainless steel and precipitation hardening stainless steel for their high exhaust purifying function.

The spirally rolled plate member (2j) and the core member (2n) may be made of any of various types of stainless steel such as martensitic stainless steel and ferritic stainless steel.

The spirally rolled plate member (2j) and the core member (2n) are made of austenitic stainless steel. The core member (2n) may be made of ferritic stainless steel. The rest of the structure is identical to the first embodiment shown in FIG. 1(A) to (C). In FIG. 4(A) to (C), any element identical to that in the first embodiment is denoted by the identical reference character used in FIG. 1(A) to (C).

Next, a description will be given of the fifth embodiment shown in FIG. 4(D).

As shown in FIG. 4(D), the spirally rolled plate member (2j) is provided with spacer projections (31) that project from the surface. The spacer projections (31) retain the exhaust passing clearance (2k).

As shown in FIG. 4(E), the spacer projections (31) are provided to the plate member (2j) in a matrix by emboss work.

As shown in FIG. 4(E) (F), the spacer projections (31) each include an exhaust passing port (32). The spacer projections (31) are each triangular pyramid-shaped, and provided therein with the exhaust passing port (32). A plurality of rows of spacer projections (31) arranged in the roll axial direction of the plate member (2j) are provided in the roll circumferential direction. The space dimension between the rows is adjusted so that the spacer projections (31) do not overlap with each other in the roll radial direction.

The exhaust passing ports (32) are opened in the roll circumferential direction of the plate member (2j). The exhaust passing ports (32) may be opened in the roll axial direction. Alternatively, part of the exhaust passing ports (32) may be opened in the roll circumferential direction, with the remainder opened in the roll axial direction. Alternatively, all or part of the exhaust passing ports (32) may be opened in a direction between the roll circumferential direction and the roll axial direction.

The rest of the structure is identical to the fourth embodiment shown in FIG. 4(A) (B) (C). In FIG. 4(D) (E) (F), any element identical to that in the fourth embodiment is denoted by the identical reference character used in FIG. 4(A) (B) (C).

In the fifth embodiment, the exhaust passing ports (32) replace the exhaust passing holes (30) according to the fourth embodiment and, therefore, the exhaust passing holes (30) are not provided. On the other hand, in the fifth embodiment also, the exhaust passing holes (30) according to the fourth embodiment may be provided at positions where no spacer projections (31) are provided, so that the exhaust passing ports (32) and the exhaust passing holes (30) can be used in combination.

Specific examples of stainless steel suitably used for the constituent components of the exhaust purifying member (2) and the cylindrical part (3a) of the holder (3) according to the first to fifth embodiments include the following, which are defined by JIS Standards (Japanese Industrial Standards).

Precipitation hardening stainless steel such as SUS630 or SUS631.

Austenitic stainless steel such as SUS316, SUS316L, SUS304, SUS31803 and SUS310S.

Martensitic stainless steel such as SUS440C.

Ferritic stainless steel such as SUS430.

The component and composition of the foregoing are shown in the table of FIG. 5.

The constituent components of the exhaust purifying member (2) and the cylindrical part (3a) of the holder (3) may be made of other type of stainless steel.

Next, a description will be given of Examples of the present invention, Comparative Examples, and Experimental Example.

Example 1

Example 1 is a specific example of the first embodiment shown in FIG. 1.

The thickness of the cylindrical part (3a) of the holder (3) is 1.2 mm, the diameter of the inner circumference is 45.0 mm, and the axial length dimension is 125 mm.

The thickness of the cylindrical member (2e) of the exhaust purifying member (2) is 1.2 mm, the diameter of the inner circumference is 42.6 mm, and the axial length dimension is 61 mm.

The number of the plate member (2b) at the intermediate position is seven. The thickness of the plate members (2a) (2c) respectively on the most exhaust upstream side and the most exhaust downstream side is 5 mm, and the thickness of the plate members (2b) at the intermediate position is 2 mm. Each of the plate members (2a) (2b) (2c) is circular plate-like, with a diameter of 42 mm. The interval distance between adjacent ones of the plate members (2a) (2b) (2c) is 4 mm. The exhaust passing holes (28) are circular, the diameter of the small-diameter exhaust passing holes is 5 mm, and the diameter of the large-diameter exhaust passing holes is 6 mm.

The diameter of the wire member (2d) is 1 mm, the diameter of the coil is 6 mm, and the pitch of the coil is 2 mm. The thickness in the radial direction of the wire member (2d) layered in the radial direction of the cylindrical member (2e) is 2.5 mm.

The cylindrical part (3a) of the holder (3) and the cylindrical member (2e) of the exhaust purifying member (2) are made of SUS436L being ferritic stainless steel.

The plate members (2a) (2c) respectively on the most exhaust upstream side and the most exhaust downstream side are made of SUS630 being precipitation hardening stainless steel. The plate members (2b) at the intermediate position are made of SUS316 being austenitic stainless steel.

The wire member (2d) is made of SUS316 being austenitic stainless steel.

The spacer ring members (2f), the mounting bolt (2g), and the mounting nut (2h) are made of SUH660 being heat resistant steel.

Example 2-1 to Example 2-3

Example 2-1 to Example 2-3 are specific examples of the second embodiment shown in FIG. 3(A).

The cylindrical part (3a) of the holder (3) and the cylindrical member (2e) of the exhaust purifying member (2) are similar to those in the first embodiment.

The diameter of the wire member (2d) is 1 mm, the diameter of the coil is 6 mm, and the pitch of the coil is 2 mm. The interposed width of the wire member (2d) interposed in the cylindrical part (3a) of the holder (3) and the cylindrical member (2e) of the exhaust purifying member (2) is 110 mm in the axial direction of the cylindrical part (3a).

As shown in FIG. 5, in Example 2-1, the wire member (2d) is made of SUS631 being precipitation hardening stainless steel.

In Example 2-2, the wire member (2d) is made of SUS316 being austenitic stainless steel.

In Example 2-3, the wire member (2d) is made of SUS316L being austenitic stainless steel.

Example 3-1 to Example 3-8

Example 3-1 to Example 3-8 are specific examples of the third embodiment shown in FIG. 3(B).

The cylindrical part (3a) of the holder (3) and the cylindrical member (2e) of the exhaust purifying member (2) are similar to those in the first embodiment.

The thickness of the three plate members (2a) (2b) (2c) being identical in thickness is 1 mm, and the interval distance between adjacent ones of the plate members (2a) (2b) (2c) is 40 mm. The plate members (2a) (2b) (2c) are each circular plate-like, with a diameter of 42 mm. The exhaust passing holes (28) are circular, and provided 20 in number with a diameter of 3 mm. The wire member (2d) has a width of about 5 mm and a thickness of about 0.3 mm. The diameter of the coil is about 3 mm, and the pitch of the coil is about 10 mm.

The interval distance between the plate member (2a) on the most upstream side and the lid part (11) is 40 mm. The width of the wire member (2d) interposed downstream to the plate member (2c) on the most downstream side is 40 mm.

The three plate members (2a) (2b) (2c) are made of SUS316 being austenitic stainless steel.

As shown in FIG. 7, in Example 3-1, the wire member (2d) is made of SUS630 being precipitation hardening stainless steel In Example 3-2, the wire member (2d) is made of SUS440C being martensitic stainless steel, in Example 3-3, the wire member (2d) is made of SUS316L being austenitic stainless steel. In Example 3-4, the wire member (2d) is made of SUS304 being austenitic stainless steel.

As shown in FIG. 8, in Example 3-5, the wire member (2d) is made of SUS430 being ferritic stainless steel.

In Example 3-6, the wire member (2d) is made of SUS316 being austenitic stainless steel.

In Example 3-7, the wire member (2d) is made of SUS31803 being austenitic stainless steel.

In Example 3-8, the wire member (2d) is made of SUS310S being austenitic stainless steel.

Example 4

Example 4 is a specific example of the fourth embodiment shown in FIG. 4(A) to (C).

The thickness of the spirally rolled plate member (2j) is 0.5 mm, the number of turns thereof is five, the outermost diameter thereof is 45 mm, and the axial length dimension is 144 mm. The clearance dimension of the exhaust passing clearance (2k) is 4 mm. The diameter of each exhaust passing hole is 2 mm. The distribution of the exhaust passing holes (20) is three per area of 25 square millimeters of the plate member (2j). The diameter of the core member (2n) is 6 mm, and the axial length dimension is 155 mm.

The cylindrical part (3a) of the holder (3) and the cylindrical member (2e) of the exhaust purifying member (2) are similar to those in the first embodiment.

The spirally rolled plate member (2j) and the core member (2n) are made of SUS316 being austenitic stainless steel. The core member (2n) may be made of SUS430 being ferritic stainless steel.

Example 5-1 to Example 5-3

Example 5-1 to Example 5-3 are specific examples of the fifth embodiment shown in FIG. 4(D) to (F).

The outer dimension and the number of turns of the spirally rolled plate member (2j), the clearance dimension of the exhaust passing clearance (2k), the diameter and distribution of the exhaust passing holes (20), and the outer dimension of the core member (2n) are similar to those in Example 4. The cylindrical part (3a) of the holder (3) and the cylindrical member (2e) of the exhaust purifying member (2) are similar to those in the first embodiment.

In Example 5-1, the plate member (2j) and the core member (2n) are made of SUS316 being austenitic stainless steel. The core member (2n) may be made of SUS430 being ferritic stainless steel.

In Example 5-2, the plate member (2j) is made of SUS316L being austenitic stainless steel. The core member (2n) is made of SUS316 being austenitic stainless steel. The core member (2n) may be made of SUS430 being ferritic stainless steel.

In Example 5-3, the plate member (2j) is made of SUS630 being precipitation hardening stainless steel. The core member (2n) is made of SUS316 being austenitic stainless steel. The core member (2n) may be made of SUS430 being ferritic stainless steel.

Comparative Examples 1, 2

As shown in FIG. 6, Comparative Example 1 corresponds to Example 1 from which the cylindrical part (3a) of the holder (3) and the exhaust purifying member (2) are removed.

Comparative Example 2 corresponds to Example 1 in which the surface of the exhaust purifying member (2) and that of the cylindrical part (3a) of the holder (3) are each covered with a catalyst coat. The catalyst coat contains Pt, Pd, Rh as catalyst components.

Experimental Example and experimental results are as follows.

Experimental Example

Exhaust was allowed to pass through the exhaust purifying apparatuses according to Examples and Comparative Examples under the following conditions, and the exhaust purifying performance of each of the exhaust purifying apparatuses were evaluated.

Using a water-cooled vertical straight twin spark engine with a displacement of 514 cc, a rated output of 9.5 kW/3600 rpm, a rated engine speed of 3600 rpm, discrete mode tests consisting of six modes shown in FIG. 9 were performed based on Sub-part F: Test Method, Voluntary Regulations for Emissions from Small General Spark Engines (the third version), Japan Land Engine Manufacturers Association. The exhaust component concentration in each mode was measured. The measurement value for each mode was weighted by a specified weight coefficient, to calculate the total amount of the exhaust matters. Thus, the exhaust purifying performance exhibited by each of the exhaust purifying apparatuses according to Examples and Comparative Examples was verified.

The exhaust purifying performance was evaluated by the amount of HC (hydrocarbon), NOx (nitrogen oxides), HC+NOx (a total of hydrocarbon and nitrogen oxides), CO (carbon monoxide) emitted from each of the exhaust purifying apparatuses. The experimental results are shown in FIGS. 6 to 8.

The unit of HC, NOx, HC+NOx, and CO is g/kWh.

Experimental Results

As shown in FIGS. 6 to 8, Example 1, Example 2-1 to 2-3, and Example 3-1 to 3-8, exhibited effective exhaust purifying performance as compared to Comparative Example 1 including none of the exhaust purifying member and the cylindrical part of the holder. Further, such Examples exhibited the exhaust purifying performance that could replace Comparative Example 2 including the exhaust purifying member and the cylindrical part of the holder each covered with a catalyst coat.

As shown in FIG. 6, as to Examples 2-1 to 2-3, the exhaust purifying performance was the best with Example 2-1, followed by 2-2, 2-3 in order.

As shown in FIGS. 7 and 8, as to Examples 3-1 to 3-8, the exhaust purifying performance was the best with Example 3-1, followed by 3-2, 3-3, 3-4, 3-5, 3-6, 3-7, 3-8 in order.

As to the exhaust purifying performance with Example 4 and Examples 5-1 to Example 5-3 also, the effective result comparable to Example 1, Examples 2-1 to 2-3, and Example 3-1 to 3-8 was obtained.

From the foregoing results, it can be seen that, by forming the exhaust purifying member (2) and the cylindrical part (3a) of the holder (3) by stainless steel, and dispensing with a catalyst coat containing a catalyst component and covering the surface of the stainless steel material, so that the surface of the stainless steel material is brought into contact with exhaust (25), high exhaust purifying performance can be attained at low manufacturing costs.

Further, it can be seen that, among various kinds of stainless steel, precipitation hardening stainless steel and austenitic stainless steel exhibit high exhaust purifying performance, and by structuring the exhaust purifying member (2) and the cylindrical part (3a) of the holder (3) by a plurality of plate members (2a) (2b) (2c), the wire member (2d), and the spirally rolled plate member (2j), high exhaust purifying performance can be attained.

While the description has been given of the embodiments and Examples and the like of the present invention in the foregoing, the present invention is not limited thereto.

For example, the exhaust processing member may be a metal honeycomb made of stainless steel, or steel wool formed by a wire member made of stainless steel woven three-dimensional mesh-like or tangled up.

Further, the exhaust processing apparatus may be used in processing exhaust from a boiler or the like, out being limited to processing of exhaust from an engine.

DESCRIPTION OF REFERENCE SIGNS (1): Exhaust passage
(2): Exhaust purifying member
(2a): Plate member
(2b): Plate member
(2c): Plate member
(2d): Wire member
(2i): Central axis
(2j): Spirally rolled plate member
(2k): Spirally rolled clearance
(3): Holder
(3a): Cylindrical part
(3b): Flange part
(4): Collector part
(4a): Tip portion
(4b): Basal end portion
(11): Lid part
(27): Exhaust manifold
(28): Exhaust passing hole
(30): Exhaust passing hole
(31): Spacer projection
(32): Exhaust passing port

The invention claimed is:

1. An exhaust purifying apparatus comprising:
an exhaust manifold (27) for an engine;
a holder (3); and
an exhaust purifying member (2), wherein
the exhaust manifold (27) includes a collector part (4) and a plurality of branch parts (5) (6),
the collector part (4) is a cylindrical element, an exhaust outlet (8) being opened at a tip portion of the collector part (4),
the plurality of branch parts (5) (6) extend from a basal end-side circumferential wall (9) of the collector part (4),
the holder (3) includes a cylindrical part (3a), the cylindrical part (3a) being disposed inside the collector part (4) of the exhaust manifold (27), an exhaust inlet (12) being opened at a circumferential wall of the cylindrical part (3a) for introducing exhaust from the plurality of branch parts (5) (6), and
the exhaust purifying member (2) is disposed inside the cylindrical part (3a) of the holder (3).

2. The exhaust purifying apparatus according to claim 1, wherein
a holder insertion port (7) is opened at a basal end portion (4b) of the collector part (4),
the holder (3) includes a flange part (3b) provided on a basal end side of the cylindrical part (3a), the cylindrical part (3a) of the holder (3) on which the exhaust purifying member (2) is mounted is inserted into the holder insertion port (7) of the collector part (4), and the flange part (3b) of the holder (3) is fixed to the basal end portion (4b) of the collector part (4).

3. The exhaust purifying apparatus according to claim 2, wherein the flange part (3b) of the holder (3) is removably attached to the basal end portion (4b) of the collector part (4).

4. The exhaust purifying apparatus according to claim 2, wherein the flange part (3b) is structured by a circumferential portion of a lid part (11) provided on a basal end side of the holder (3), and the lid part (11) closes the holder insertion port (7).

5. The exhaust purifying apparatus according to claim 1, wherein a circumferential wall of the exhaust purifying member (2) is fitted from inside with a tip portion (4a) of the collector part (4), and while the engine is in operation, thermal expansion of the circumferential wall of the exhaust purifying member (2) presses the circumferential wall of the exhaust purifying member (2) against a circumferential wall of a tip portion (4a) of the collector part (4).

6. The exhaust purifying apparatus according to claim 1, wherein the cylindrical part (3a) of the holder (3) is made of stainless steel, and a surface of the stainless steel material is not covered with a catalyst coat containing a catalyst component, so that the surface of the stainless steel material is brought into contact with exhaust (25).

7. The exhaust purifying apparatus according to claim 1, wherein the exhaust purifying member (2) is made of stainless steel, and a surface of the stainless steel material is not covered with a catalyst coat containing a catalyst component, so that the surface of the stainless steel material is brought into contact with exhaust (25).

8. The exhaust purifying apparatus according to claim 7, wherein the exhaust purifying member (2) is made of precipitation hardening stainless steel and/or austenitic stainless steel.

9. The exhaust purifying apparatus according to claim 7, wherein the exhaust purifying member (2) includes a plurality of plate members (2a) (2b) (2c) made of stainless steel and keeping a predetermined interval in a passage forming direction of the exhaust passage (1), and the plate members (2a) (2b) (2c) each include an exhaust passing hole (28).

10. The exhaust purifying apparatus according to claim 9, wherein the plate member (2a) on a most exhaust upstream side is formed to be greater in thickness than a predetermined one of the plate members (2b) on an exhaust downstream side.

11. The exhaust purifying apparatus according to claim 9, wherein the plate member (2c) on a most exhaust downstream side is formed to be greater in thickness than a predetermined one of the plate members (2b) on an exhaust upstream side.

12. The exhaust purifying apparatus according to claim 9, wherein the plate member (2a) on the most exhaust upstream side is made of precipitation hardening stainless steel.

13. The exhaust purifying apparatus according to claim 9, wherein the plate member (2c) on the most exhaust downstream side is made of precipitation hardening stainless steel.

14. The exhaust purifying apparatus according to claim 9, wherein a predetermined one of the plate members (2b) on the exhaust downstream side is made of austenitic stainless steel.

15. The exhaust purifying apparatus according to claim 7, wherein the exhaust purifying member (2) includes a wire member (2d) made of stainless steel and interposed in the exhaust passage (1).

16. The exhaust purifying apparatus according to claim 15, wherein the wire member (2d) is wound to be coil-shaped.

17. The exhaust purifying apparatus according to claim 15, wherein the exhaust purifying member (2) includes the plurality of the plate members (2a) (2b) (2c) made of stainless steel and the wire member (2d) made of stainless steel, the plate members (2a) (2b) (2c) are disposed in the passage forming direction of the exhaust passage (1) while keeping a predetermined interval, the plate members (2a) (2b) (2c) each include an exhaust passing hole (28), and the wire member (2d) is interposed between adjacent ones of the plate members (2a) (2b) (2c).

18. The exhaust purifying apparatus according claim 7, wherein the exhaust purifying member (2) includes a spirally rolled plate member (2j) made of stainless steel and having a central axis (2i) in the passage forming direction of the exhaust passage (1), and inside the spirally rolled plate member (2j), an exhaust passing clearance (2k) spirally rolled along a surface of the spirally rolled plate member (2j) is formed.

19. The exhaust purifying apparatus according to claim 18, wherein the spirally rolled plate member (2j) is provided with an exhaust passing hole (30) that penetrates in a thickness direction.

20. The exhaust purifying apparatus according to claim 18, wherein the spirally rolled plate member (2j) is provided with a spacer projection (31) projecting from the surface of the spirally rolled plate member (2j), the spacer projection (31) retaining the exhaust passing clearance (2k).

21. The exhaust purifying apparatus according to claim 20, wherein the spacer projection (31) includes an exhaust passing port (32).

* * * * *